United States Patent [19]
Farha

[11] Patent Number: 5,472,753
[45] Date of Patent: Dec. 5, 1995

[54] POLYETHYLENE TEREPHTHALATE-CONTAINING LAMINATE

[75] Inventor: Said K. Farha, Chappaqua, N.Y.

[73] Assignee: PepsiCo Inc., Purchase, N.Y.

[21] Appl. No.: 267,476

[22] Filed: Jun. 28, 1994

[51] Int. Cl.$^6$ .......................... B32B 27/04; B32B 27/08; B65D 1/00
[52] U.S. Cl. .................. 428/35.7; 428/36.6; 428/480; 428/483
[58] Field of Search .................. 428/480, 483, 428/35.7, 36.6

[56] References Cited

U.S. PATENT DOCUMENTS

| | | |
|---|---|---|
| 4,011,358 | 3/1977 | Roelofs . |
| 4,091,150 | 5/1978 | Roelofs . |
| 4,284,671 | 8/1981 | Cancio et al. . |
| 4,387,129 | 6/1983 | Vincent . |
| 4,482,586 | 11/1984 | Smith et al. . |
| 4,504,531 | 3/1985 | Murata et al. . |
| 4,564,541 | 1/1986 | Taira et al. ............................. 428/36.6 |
| 4,601,926 | 7/1986 | Jabarin et al. . |
| 4,618,386 | 10/1986 | Yatsu et al. . |
| 4,942,008 | 7/1990 | Cahill . |
| 5,134,201 | 7/1992 | Billovits et al. . |
| 5,153,038 | 10/1992 | Koyama et al. ..................... 428/36.7 |

OTHER PUBLICATIONS

White et al., *Polymer Preprints*, 34(1):904–905 (1990).

Primary Examiner—P. C. Sluby
Attorney, Agent, or Firm—Scully, Scott, Murphy & Presser

[57] ABSTRACT

A first laminate which includes a first layer of a phenoxy-type thermoplastic, a second layer of an amorphous thermoplastic copolyester and a third layer of polyethylene terephthalate. A second laminate includes a first layer of a composition of a phenoxy-type thermoplastic and an amorphous thermoplastic copolyester and a second layer of polyethylene terephthalate. Preferably, these laminates are annular with the first layer being the outer ply. Plastic bottle preforms and plastic bottles are commercially important applications of the preferred embodiment wherein an annular laminate is employed.

27 Claims, 2 Drawing Sheets

POLYETHYLENE TEREPHTHALATE-CONTAINING LAMINATE

BACKGROUND OF THE DISCLOSURE

1. Field of the Invention

The instant invention is directed to the plastic laminate of two or three plys useful in manufacturing plastic fabricated articles, especially containers, and more particularly, beverage containers. More particularly, the present invention relates to a two- or three-ply laminate, each such laminate including a layer of polyethylene terephthalate, characterized by the inclusion of a gas barrier layer which is well suited for holding carbonated beverages.

2. Background of the Prior Art

The phenomenal growth in the use of plastic containers to hold foods, household aids and the like evidences its unique suitability to these applications. Among these commercial successes, the use of plastic bottles to contain carbonated beverages has been particularly noteworthy. The reason, for this commercial success has been ascribed to the principal resin utilized in this application, polyethylene terephthalate (PET). PET, when biaxially oriented, produces a bottle whose advantages include low cost, light weight, durability, rigidity and clarity.

PET, and bottles made therefrom, however, is characterized by one major detrimental property which is important insofar as carbonated beverages are concerned. That detrimental property is gas permeability. Carbonated beverages, of course, depend on the maintenance of a requisite concentration of carbon dioxide gas pressure to maintain the carbonated quality of the beverage. However, a bottle formed solely of PET permits loss of carbonation because this resin provides only a limited barrier to escaping carbon dioxide gas. Of less importance but of some significance is the fact that this gas permeability also permits introduction of oxygen. Oxygen degrades taste. However, long shelf life, that is the retention of carbonation over long periods of time, represents a major problem associated the use of PET bottles employed to contain carbonated beverages.

Indeed, gas permeability has prevented the widespread use of low volume PET carbonated beverage bottles, albeit they are widely used as high volume containers. That is, the use of PET bottles is usually limited to bottles which contain at least 1 liter of carbonated beverage. This, of course, is due to the relationship between beverage volume and the unit surface area of the bottle. The greater the beverage volume, the greater is the ratio of beverage volume to surface area of the bottle. Those skilled in the art are aware that the greater this ratio the lesser is the degree of gas loss, in this case, carbonation. However, the limited nature of the gas barrier property provided by PET has prevented the use of these bottles in smaller volume containers.

An obvious solution of this problem is a laminated container which includes a layer of a resin having little or substantially no permeability to gases, that is, a gas barrier layer. Indeed, a plurality of references disclose PET bottles, used to contain carbonated beverages, which include a gas barrier layer. Some of the more important of these references include U.S. Pat. No. 4,284,671 to Cancio et al.; U.S. Pat. No. 4,482,586 to Smith et al.; U.S. Pat. No. 4,564,541 to Taira et al.; U.S. Pat. No. 4,601,926 to Jabrin et al.; and U.S. Pat. No. 4,618,386 to Yatsu et al.

A major drawback to the advance in the art provided by these patents, and many other references which can be cited, is the complexity of the laminate structure required to eliminate gas permeability of PET-containing bottles. This complexity is manifested by preferred embodiments mentioned therein which include at least five plys.

The requirement in many of these references that the laminate include at least five plies is caused by the non-compatibility between the gas barrier layer and the polyethylene terephthalate layer. Thus, the laminates within the contemplation of the these patents requires that the gas barrier layer be bonded, on both sides, with an adhesive which, in turn, is bonded to an inner layer of PET and to an outer layer which may be PET or the like.

A preferred gas barrier layer used in many of these references is a polar resin, i.e. polyvinylalcohol (PVOH) or ethylene-vinyl alcohol copolymer (EVOH). Thus, a preferred laminate utilized in forming a beverage bottle in accordance with many of these patents includes a PET outer layer, an adhesive layer, a layer of a gas barrier polar resin, another adhesive layer and finally a PET inner layer.

Some of these references attempt to overcome this obvious disadvantage by blending the gas barrier resin with a resin compatible with PET so that the number of plies can be reduced. This expedient is certainly advantageous. However, this is ineffective in most cases since the preferred gas barrier resins are polar. Specifically, as stated above, most references directed to PET bottles which utilize a gas barrier resin include poly(vinyl alcohol) (PVOH), ethylene-vinyl alcohol copolymers (EVOH) or the like as the gas barrier resin layer.

Those skilled in the art are aware that for economic and ecological reasons PET bottles are recycled and reused in freshly made bottles. To that end the used bottle is ground into chips, powders and the like and melted. Commonly employed vinyl alcohol-containing polymers are incompatible with molten PET. As such, the use of bottles which contain polar gas barrier resins even if employed in direct contact with PET cannot be recycled to produce new PET carbonated beverage bottles.

The above problems, associated with the development of a PET-containing laminate plastic carbonated beverage bottle, has suggested the substitution of other gas barrier polymers. One such class of polymers, known to possess moderate to high gas barrier properties, are the so-called "phenoxy-type" thermoplastics. A specific class of such polymers, including poly(hydroxy ethers), poly(hydroxy ester ethers) and poly(hydroxy amino ethers), is described in White et al., *Polymer Preprints*, 34(1), 904–905 (1993). These phenoxy-type thermoplastics are recited therein to have good oxygen barrier properties combined with excellent mechanical properties. The paper indicates that such polymers can be fabricated into films and containers. However, no suggestion is given in this reference of utilizing such polymers with thermoplastic polyesters in general or PET bottles in particular.

The above discussion suggests the need in the art for an improved laminate structure which can be utilized to make bottles holding small volumes of carbonated beverage which are easy to fabricate, eliminate carbonation loss, are characterized by the excellent properties associated with PET bottles presently used in the formation of large volume carbonated beverage bottles and employ compatible resins which are capable of being recycled.

BRIEF SUMMARY OF THE INVENTION

A laminate has now been developed which permits the retention of the excellent physical properties associated with PET but which is characterized by excellent resistance to gas permeability without the attendant processing requirements associated with the formation of laminates of more than three layers. The laminate of the present invention is furthermore recyclable because of the compatibility of the resins used therein.

In accordance with the present invention a three-ply laminate is provided which includes a first layer of a phenoxy-type thermoplastic, a second layer of an amorphous thermoplastic copolyester and an third layer of PET.

In further accordance with the present invention a two-ply laminate is disclosed. This laminate comprises a first layer of a composition which includes a phenoxy-type thermoplastic and an amorphous thermoplastic copolyester and a second layer of PET.

BRIEF DESCRIPTION OF THE DRAWINGS

The present invention will be better understood with reference to the following drawings of which.

DETAILED DESCRIPTION

The present invention is directed to a two- or a three-ply laminate, one layer of which is polyethylene terephthalate (PET). Turning first to the three-ply laminate of the present invention, that laminate includes a first, usually an outer, layer of a phenoxy-type thermoplastic. Phenoxy-type thermoplastics within the contemplation of this invention include poly(hydroxy ethers), poly(hydroxy ester ethers) and poly(hydroxy amino ethers) having a high degree of polymerization. Preferred embodiments of these phenoxy-type thermoplastics are characterized by the repeating structural unit where R is

-continued and

It is noted that no number of repeating units is provided in repeating structural unit I. Suffice it to say, there is no lower limit to the number of repeating structural units beyond the requirement that the polymer be of high molecular weight. It is particularly preferred, however, that there be at least about 50 repeating units.

Of the three preferred classes of phenoxy-type thermoplastics within the scope of the present invention, the class of poly(hydroxy amino ethers) are particularly preferred. Two preferred species of homopolymers within this preferred class of poly(hydroxy amino ethers) include those having the repeating structural unit I where R is in the other. In both homopolymers $R^1$ is In addition to the above homopolymers a specific preferred copolymer of a poly(hydroxy amino ether) is one having the repeating structural unit

(II)

Of the three above preferred species of this particularly preferred class of poly(hydroxy amino ether) thermoplastics, the homopolymer which has the repeating structural unit I, where R is and

In the alternate embodiment wherein the phenoxy-type thermoplastic is a poly(hydroxy ether), that thermoplastic has the repeating structural unit I where R is or and R₁ is

In another preferred embodiment of the phenoxy-type thermoplastic, the thermoplastic is a poly(hydroxy ester ether) having the repeating structural formula (I) where and
$R^1$ is

A second component of the three-ply laminate is a second, usually an intermediate, layer of an amorphous, thermoplastic copolyester. Preferably, this polyester is the amorphous transparent polymer poly(1,4-cyclohexylenemethylene)terephthalate-co-isophthalate. Poly(1,4-cyclohexylenemethylene)terephthalate-co-isophthalate is formed by replacement of part of the ethylene glycol in PET with cyclohexanedimethanol. Additionally, some terephthalic acid is replaced with isophthalic acid to produce this novel amorphous copolymer, which, as will be discussed below, has the useful property of being injection moldable.

A particularly preferred embodiment of the poly(1,4-cyclohexylenemethylene)terephthalate-co-isophthalate is a copolyester having a glass-transition temperature ($T_g$) of about 81° C., as determined by differential scanning calorimetry. This preferred embodiment has a number average molecular weight of about 28,000.

The third and final ply of the preferred three-ply laminate embodiment of the present invention is a third layer, usually an inner layer, of polyethylene terephthalate which, as indicated earlier, is denoted as PET. The PET within the contemplation of the present invention includes polymers wherein at least about 97% of the polymer contains the repeating ethylene terephthalate unit

III

The remainder of the polymer, if present, is minor amounts of ester-forming components. PET, within the contemplation of the present invention, also includes copolymers of ethylene terephthalate wherein up to about 10 mole percent of the copolymer is prepared from monomeric units of diethylene glycol, propane-1,3-diol, butane-1,4-diol, polytetramethylene glycol, polyethylene glycol, polypropylene glycol, 1,4-hydroxymethylcyclohexane and the like, substituted for the glycol moiety in the preparation of the copolymer, or isophthalic, bibenzoic, naphthalene 1,4- or 2,6-dicarboxylic, adipic, sebacic, decane-1,10-dicarboxylic acids and the like substituted for the acid moiety in the preparation of the copolymer.

As indicated above, the laminate structure of the present invention may be, alternatively, two-ply. The two-ply laminate of the present invention is distinguished from the above-discussed three-layer laminate by replacing the first and second plies of the three-ply laminate, i.e. the phenoxy-type thermoplastic polymer layer and the amorphous poly(1,4-cyclohexylenemethylene terephthalate-co-isophthalate)

layer, with a single ply of a composition which includes one of the phenoxy-type thermoplastics defined above and an amorphous copolyester layer.

The preferred species of the phenoxy-type thermoplastic and the amorphous copolyester employed in the composition which constitutes the first layer of the two-ply laminate of the present invention is preferably the same species preferred in the three-ply laminate of the instant invention. Thus, it is preferred that the phenoxy-type thermoplastic have the structural formula I. More preferably, the phenoxy-type thermoplastic component of the composition of the two ply laminate is a poly(hydroxy amino ether) having the structural formula I. Still more preferably, the poly(hydroxy amino ether) of the composition of the two ply laminate has the structural formula I where R is and $R^1$ is Similarly, the amorphous copolyester component of the composition ply of the two ply laminate is preferably poly(1,4-cyclohexylenemethylene)terephthalate-co-isophthalate. More preferably, that specific copolyester has a glass transition temperature of about 81° C., as determined by differential scanning calorimetry, and a number average molecular weight of about 28,000.

In a preferred embodiment the first, usually outer, layer of the two ply laminate comprises a polymeric composition which includes between about 50% and about 90% of the phenoxy-type thermoplastic and about 10% to about 50% of the amorphous copolyester polymer, said percentages being by weight, based on the total weight of the composition.

More preferably, the first ply is a composition of a phenoxy-type thermoplastic and an amorphous copolyester wherein the phenoxy-type thermoplastic is present in a concentration in the range of between about 50% and about 70% and the amorphous copolyester comprises between about 30% and about 50%, said percentages again being by weight, based on the total weight of the composition.

Although any standard blending method to combine the phenoxy-type thermoplastic and amorphous copolyester may be utilized it is preferred that these polymers be mixed together in a static mixer.

The second, usually inner, ply of the two-ply laminate of the present invention is identical to the inner ply in the three-ply embodiment of the laminate structure. That is, the second ply is polyethylene terephthalate.

Although the inventors do not wish to be bound by any theory explaining the operation of their invention, they speculate that the amorphous copolyester, disposed as an intermediate layer between the phenoxy-type thermoplastic layer and the PET layer in the three-ply laminate embodiment, is compatible with and thus adheres to both of these plies. The two layers that constitute the two-ply embodiment of the present invention adhere to each other, it is theorized, primarily because of the compatibility and, therefore, because of the bond formed between the copolyester constituent of the first, outer layer polymeric composition and the PET of the second, inner layer.

The reason why the terms "inner" and "outer" have been used to complement the recitation of first and second or third in describing the two- and three-ply laminate structures of the present invention is because, in a preferred embodiment of these laminate structures, they are in cylindrical shape. More preferably, the laminate structure is in the form of a preform. A preform, as those skilled in the art are aware, is a structure that when expanded in a mold can be formed into a useful fabricated article such as a bottle. Still more preferably, the laminate structure is, indeed, in the form of a bottle.

Figure 1:
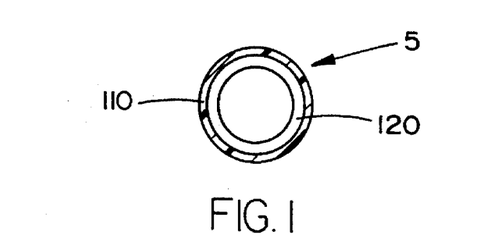
FIG. 1 is a cross-sectional view of a two-ply laminate of the laminate structure of the present invention.

The above laminate structures are illustrated in the drawings. A two-ply laminate, shown in the preferred embodiment wherein it is in the form of a cylinder 5, is depicted in cross-section in FIG. 1. The cylinder 5 includes a first, outer layer 110 which is a composition of a phenoxy-type thermoplastic and an amorphous copolyester bonded to a second, inner layer 120 of PET.

Figure 2:
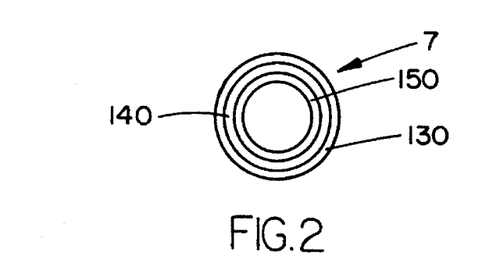
FIG. 2 is a cross-sectional view of a three-ply laminate of the laminate structure of the present invention.

A cylinder 7 of a three-ply laminate is depicted in cross-section in FIG. 2. The cylinder 7 is again employed to illustrate the three ply laminate insofar as an annular laminate represents a preferred embodiment of the three-ply laminate of the present invention. It includes a first, outer layer 130 of a phenoxy-type thermoplastic resin. The cylindrical laminate 7 includes a second, intermediate layer 140 bonded to layer 130. The layer 140 comprises an amorphous copolyester resin. Finally, cylinder 7 includes a third, inner ply 150 which is, as in cylinder 5, a PET resin.

Figure 3:
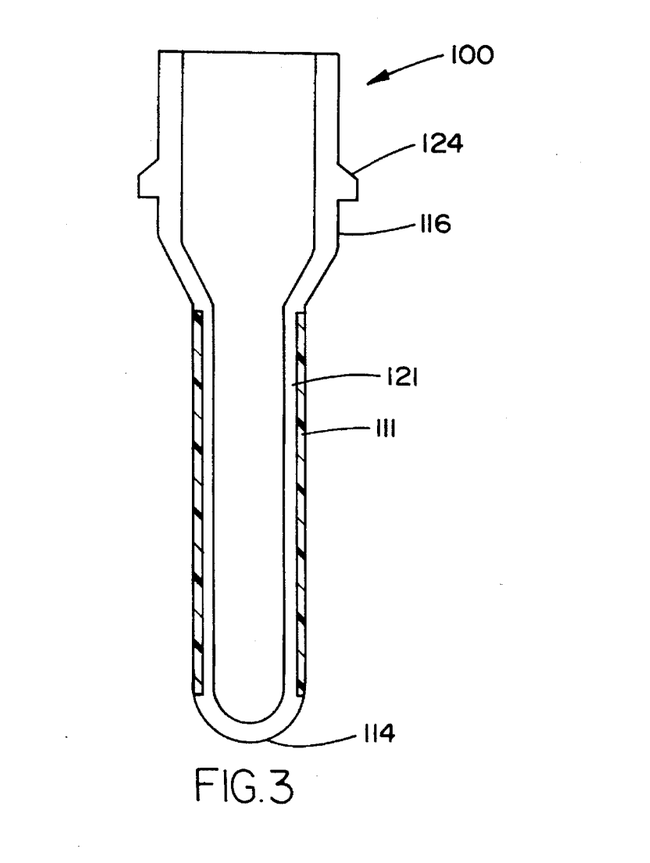
FIG. 3 is a cross-sectional view of a plastic preform utilizing the laminate of FIG. 1.

The preferred embodiment wherein the two-ply laminate is in the form of a plastic preform is illustrated at 100. The preform 100 includes an outer layer 111 of the phenoxy-type thermoplastic-amorphous copolyester polymeric composition and an inner layer 121 of a PET resin.

As explained in U.S. Pat. No. 4,942,008 to Cahill, incorporated herein by reference, a preform may be designed, as illustrated herein at 100, for conversion into a carbonated beverage bottle. As such, the preform 100 is a two-ply laminate which includes an outer layer 111 of the polymeric composition, equivalent to the layer 110 of the two-ply laminate 5, and an inner layer 121, equivalent to the layer 120 of the two-ply laminate 5, of PET. Typical of the laminate preforms of the prior art, illustrated by U.S. Pat. No. 4,942,008, the preform 100 includes bottom and neck portions 114 and 116, respectively, which are not laminated but are, rather, totally formed of the PET inner layer resin. As shown at 124, one or more threads may be provided in the neck portion 116 to accommodate a bottle cap after preform 100 is expanded to form a bottle as discussed below. This design is also in accordance with the teaching of U.S. Pat. No. 4,942,008. and a multiplicity of prior art references.

Figure 4:
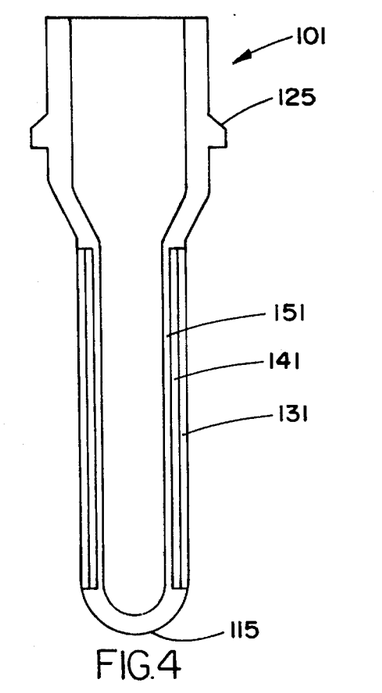
FIG. 4 is a cross-sectional view of a plastic preform utilizing the laminate of FIG. 2.

Preform 101 is a preform employing the three-ply laminate of the present invention wherein outer ply 131 is a layer of a phenoxy-type thermoplastic, middle ply 141 is a layer of an amorphous copolyester and inner ply 151 is a layer of PET. But for the substitution of three plies for the two plies of preform 100, preform 101 is otherwise identical. Thus, the bottom and neck portions, shown at 115 and 125, respectively, are not laminated. As in the case of preform 100, the bottom portion 115 and the neck portion 125 of preform 101 are constructed entirely of the inner layer PET resin. Furthermore, one or more threads 125 may be provided to accommodate a cap.

The outer layers 110 and 130 of laminate structures 6 and 7, respectively, as well as outer layers 111 and 131 of preforms 100 and 101, respectively, may contain additives such as dyes, colorants, ultraviolet light absorbers, antistatic agents, dye receptors and the like to permit the inclusion of printing material and to provide protection for the contents in the preferred embodiment wherein the laminate is used in the formation of a bottle filled with a beverage, a food or the like. It is noted that the preforms 100 and 101 are designed such that only the inner layers of 121 and 151 of preforms 100 and 101 actually contact the consumable material, and as suggested hereinabove, the inner layers remain free of additives.

Figure 5:
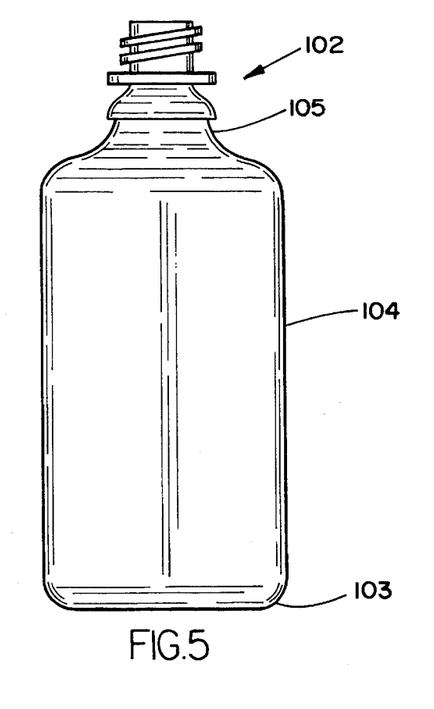
FIG. 5 is a cross-sectional view of a bottle made from a preform of either FIG. 3 or 4.

The preform, independent of the number of plies, is injection blow molded into a bottle by methods well known in the art. A typical bottle so formed is the bottle depicted in FIG. 5 at 102. The bottle 102 includes a body portion 104 of at least two plies, a bottom portion 103 and a neck portion 105.

One process by which the laminate structures of the present invention are formed into preforms and, thereafter, into bottles is in accordance with the co-extrusion process described in the aforementioned U.S. Pat. No. 4,942,008, incorporated herein by reference. Of course, the specific identity of the individual layers of the two- and three-ply laminate structures of the present invention are those described herein rather than the resins employed in U.S. Pat. No. 4,942,008, with the exception that the inner PET layer in U.S. Pat. No. 4,942,008 is identical to the laminate structures of the present invention.

To summarize the co-extrusion process of U.S. Pat. No. 4,942,008, as it applies to the formation of the two- and three-ply laminate structures of the subject invention, the first step involves the formation of a tube of a single ply, in the formation of the two-ply laminate, and a tubular laminate structure of an inner and outer ply, in the formation of the three-ply laminate.

The product of this extrusion step, either a single ply tube, when a two ply preform is to be formed, or a two ply tube, in the case wherein a three-ply laminate is to be prepared, are both cut to a length, appropriate no the size constraints of an injection mold of the type depicted in U.S. Pat. No. 4,942,008 at 26, to form a sleeve. Such a sleeve is illustrated by reference numeral 62 in U.S. Pat. No. 4,942,008.

In the embodiment wherein the co-extrusion process is practiced to produce a three ply laminate it is preferred that two or three extruders be utilized. A first extruder extrudes the phenoxy-type thermoplastic. A second extruder extrudes the amorphous copolyester. Finally, in an alternate embodiment, wherein used PET is included, as discussed below, a third extruder is employed to extrude molten recycle PET.

Each of the two or three streams are fed into a common annular die. The phenoxy-type thermoplastic is fed into the outer annular orifice of the die. The amorphous copolyester is fed into the inner orifice, in the case where two extruders are utilized, and into the middle orifice in the case of the use of three extruders. Finally, when recycled PET is utilized, it is always fed into the inner annular orifice of the die.

The molten resins are processed at a temperature in the range of between about 400° F. and about 550° F., more preferably, between about 450° F. and about 500° F., under a pressure of between about 800 psi and about 4,000 psi.

In the formation of the formation of the "two ply" laminate one or two extruders are utilized. In the case where no recycled or used PET is included, a single extruder feeding a composition of phenoxy-type thermoplastic and amorphous copolyester is used. When recycled PET is provided two extruders are present. Again, in the case of the use of two extruders, the molten products are fed into a single annular orifice wherein the composition stream is fed into the outer annular orifice and the PET is fed into the inner annular orifice. The thermodynamic conditions under which these operations are conducted are the same as those employed in the operation used to form the three ply embodiment.

It should be emphasized that the tube, from which the sleeve is cut, although preferably prepared by traditional extrusion means utilizing a circular die, may be prepared by other techniques known in the art.

The so-described sleeve is disposed in an injection mold, generally denoted in the '008 patent by reference numeral 26, and molten PET is injected therein through appropriate means such as a gate in the mold denoted in the '008 patent at 46. The product of this process step is a preform of either two or three plies depending upon whether the sleeve was one or two plies.

The resultant preform is expanded to form bottles by methods well known in the art. Typically the preform is placed into a mold having the shape of the desired bottle, heated and expanded into a bottle having the shape of the mold.

A second method to prepare the laminate, preform and bottle of the present invention involves the well known co-injection method. In this method the outer of the two or three-ply laminate is formed in a mold shaped in the form of the desired preform. This is accomplished by injecting a melt of the phenoxy-type thermoplastic, in the case of the three-ply laminate, or a melt of the composition of the phenoxy-type thermoplastic and the amorphous copolyester, in the formation of the two-ply laminate. The melt is allowed to cool to form a solid. Thereupon a melt of the plastic that is adjacent to the outer layer is introduced into the same mold. Thus, in the formation of a three-ply laminate, the second layer is an amorphous copolyester. When a two-ply laminate is formed the second molten plastic introduced is PET.

Independent of whether a two- or three-ply laminate is prepared, the product of the second injection step is cooled, and, in the case of the two-ply laminate embodiment, a preform is removed. In the case of a three-ply laminate embodiment, after cooling the thus formed two-ply laminate, molten PET is injected into the mold. The cooled product of this step is a preform of three plies. This product is then removed from the mold.

The preform product formed in accordance with the co-injection method is converted into a bottle by injection blow molding expansion as discussed above in the discussion of the co-extrusion method.

As stated earlier, economic and ecological advantages are obtained in recycling used PET bottles. To that end used PET, primarily provided by ground up used PET beverage bottles, is melted and reformed as part of newly formed bottles.

In the preferred embodiment wherein used PET is utilized in the co-extrusion process an additional ply is extruded into a tube, thereupon cut into a sleeve and then introduced into an injection mold. As a result, the single ply tube, which is formed into a two ply laminate in an injection mold, is, in this preferred embodiment, extruded into a two-ply tube, the outer ply being the composition of phenoxy-type thermoplastic and amorphous copolyester and the inner ply used PET. In the formation of the three ply laminate the tube, cut into a sleeve, is now a three ply tube rather than a two-ply tube. The three ply tube constitutes an outer ply of a phenoxy-type thermoplastic, a middle ply of an amorphous copolyester and an inner ply of previously used PET.

In the co-injection process the formation of the two- and three-ply laminates are identically prepared but for an additional step, the introduction of molten used PET before the final step of introducing molten virgin PET.

In both processes, the beverage or other foodstuff contacting the plastic bottle only contacts pure, virgin PET and thus presents no sanitary or health hazard.

No drawings are provided to illustrate three- and four-ply embodiments, equivalent to the two- and three-ply embodiments, but for the inclusion of a layer of recycled PET. Strictly speaking, the so-called recycled PET layers can be perceived as distinct from the virgin PET layer only insofar as the used PET layer may contain additives, adhesives and the like employed in previously made bottles. Because these additional materials are usually present in small concentration, the two plies that constitute the new and used PET layers, from the chemical point of view, are not distinct in the sense that they cannot be separated from each other. For this reason there is no detectible ply definition between the old and new PET layers. Moreover, between them to hold them together. To all intents and purposes, they constitute a single ply.

The above embodiments are given to illustrate the scope and spirit of the present invention. These embodiments will make apparent, to those skilled in the art, other embodiments and examples. These other embodiments and examples are within the contemplation of the present invention. Therefore, the present invention should be limited only by the appended claims.

What is claimed is:

1. A laminate comprising a first layer of a phenoxy-type thermoplastic selected from the group consisting of a poly(hydroxy ether), a poly(hydroxy ester ether) and a poly(hydroxy amino ether), a second layer of an amorphous thermoplastic copolyester and a third layer of polyethylene terephthalate.

2. A laminate in accordance with claim 1 wherein said phenoxy-type thermoplastic has the repeating structural unit

$$-(O-CH_2-CHOH-CH_2-R-CH_2-CHOH-CH_2-O-R^1-)$$

where R is and $R^1$ is

3. A laminate in accordance with claim 2 wherein said phenoxy-type thermoplastic is a poly(hydroxy amino ether) wherein R is and $R^1$ is 4. A laminate in accordance with claim 3 wherein R is

5. A laminate in accordance with claim 1 wherein said amorphous thermoplastic copolyester is poly(1,4-cyclohexylenemethylene)terephthalate-co-isophthalate.

6. A laminate comprising a first layer of a composition which includes a phenoxy-type thermoplastic selected from the group consisting of a poly(hydroxy ether), a poly(hydroxy ester ether) and a poly(hydroxy amino ether) and an amorphous thermoplastic copolyester and a second layer of polyethylene terephthalate.

7. A laminate in accordance with claim 6 wherein said phenoxy-type thermoplastic has the repeating structural unit

$$-(O-CH_2-CHOH-CH_2-R-CH_2-CHOH-CH_2-O-R^1-)$$

where R is and $R^1$ is

8. A laminate in accordance with claim 7 wherein said phenoxy-type thermoplastic is a poly(hydroxy amino ether) wherein R is and $R^1$ is 9. A laminate in accordance with claim 8 wherein R is 10. A laminate in accordance with claim 6 wherein said amorphous thermoplastic copolyester of said first layer is poly(1,4-cyclohexylenemethylene)terephthalate-co-isophthalate.

11. An annular laminate comprising an outer layer of a phenoxy-type thermoplastic selected from the group consisting of a poly(hydroxy ether), a poly(hydroxy ester ether) and a poly(hydroxy amino ether), an intermediate layer of an amorphous thermoplastic copolyester and an inner layer of polyethylene terephthalate.

12. An annular laminate in accordance with claim 11 wherein said phenoxy-type thermoplastic has the repeating structural unit

$$-(O-CH_2-CHOH-CH_2-R-CH_2-CHOH-CH_2-O-R^1-)$$

where R is

-continued and R¹ is or

13. An annular laminate in accordance with claim 12 wherein said phenoxy-type thermoplastic is a poly(hydroxy amino ether) wherein R is and R¹ is

14. An annular laminate in accordance with claim 13 wherein R is

15. An annular laminate in accordance with claim 11 wherein said amorphous thermoplastic copolyester is poly(1,4-cyclohexylenemethylene)terephthalate-co-isophthalate.

16. An annular laminate in accordance with claim 14 wherein said amorphous thermoplastic copolyester is poly(1,4-cyclohexylenemethylene)terephthalate-co-isophthalate.

17. A preform which comprises said annular laminate of claim 16.

18. A plastic bottle which comprises said annular laminate of claim 16.

19. An annular laminate comprising an outer layer of a composition of a phenoxy-type thermoplastic and an amorphous thermoplastic copolyester and an inner layer of polyethylene terephthalate.

20. An annular laminate in accordance with claim 19 wherein said phenoxy-type thermoplastic of said outer layer is selected from the group consisting of a poly(hydroxy ether), a poly(hydroxy ester ether) and a poly(hydroxy amino ether).

21. An annular laminate in accordance with claim 20 wherein said phenoxy-type thermoplastic has the repeating structural unit

$$-(O-CH_2-CHOH-CH_2-R-CH_2-CHOH-CH_2-O-R^1-)$$

where R is and R¹ is or

22. An annular laminate in accordance with claim 21 wherein said phenoxy-type thermoplastic is a poly(hydroxy amino ether) wherein R is and $R^1$ is 23. An annular laminate in accordance with claim 22 wherein R is 24. An annular laminate in accordance with claim 23 wherein said amorphous thermoplastic copolyester is poly(1,4-cyclohexylenemethylene)terephthalate-co-isophthalate.

25. An annular laminate in accordance with claim 19 wherein said amorphous thermoplastic copolyester is poly(1,4-cyclohexylenemethylene)terephthalate-co-isophthalate.

26. A preform which comprises said annular laminate of claim 24.

27. A plastic bottle which comprises said annular laminate of claim 24.

* * * * *

UNITED STATES PATENT AND TRADEMARK OFFICE
CERTIFICATE OF CORRECTION

PATENT NO. : 5,472,753
DATED : December 5, 1995
INVENTOR(S) : Said K. Farha

It is certified that error appears in the above-indentified patent and that said Letters Patent is hereby corrected as shown below:

Column 4, line 31: insert -- $R_1$ is --

Column 7, line 14: insert -- $R^1$ is --

Column 8, line 5: insert -- R is --

Signed and Sealed this

Second Day of July, 1996

Attest:

BRUCE LEHMAN

*Attesting Officer*  *Commissioner of Patents and Trademarks*